May 24, 1960
J. J. KEILMAN
2,938,111
FLASHLIGHT CONSTRUCTION
Filed Aug. 27, 1958
2 Sheets-Sheet 1
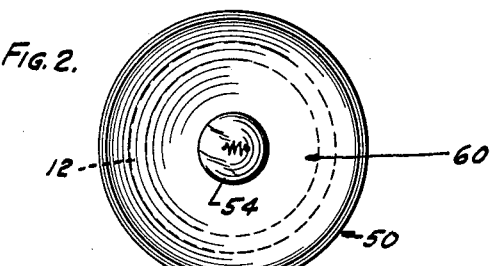
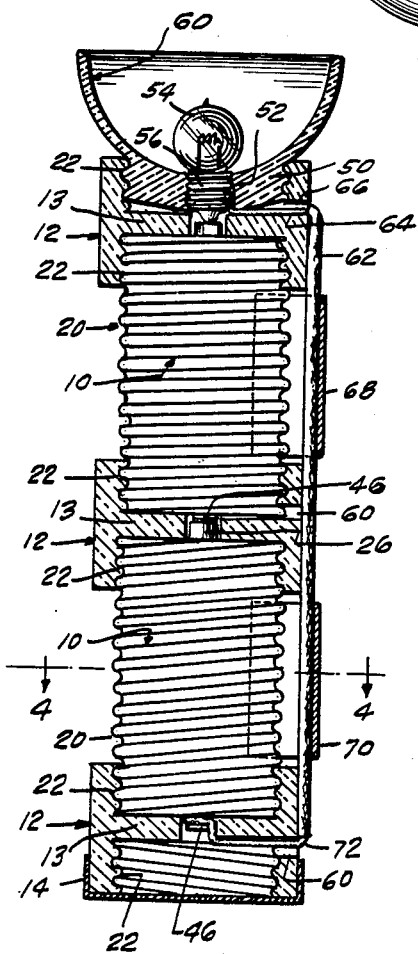
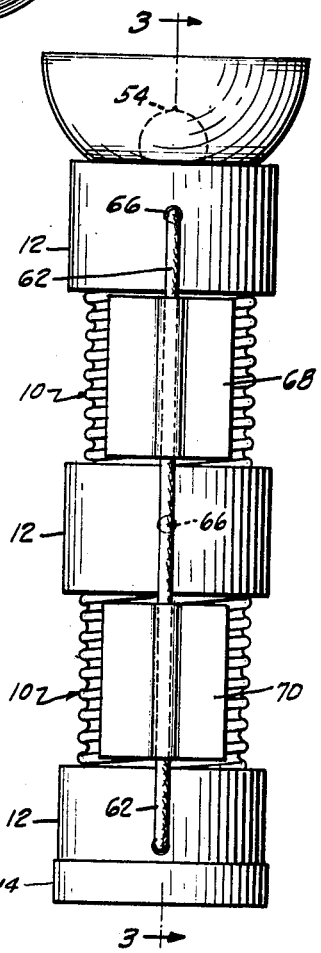
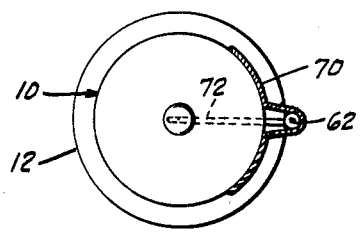
INVENTOR.
JAMES J. KEILMAN
BY
Harry H. Hitzeman
ATTORNEY.

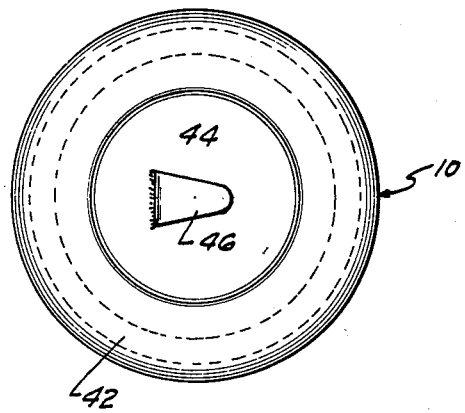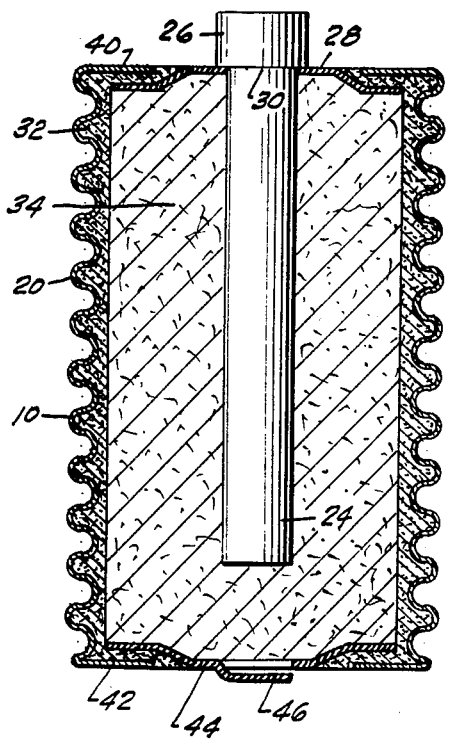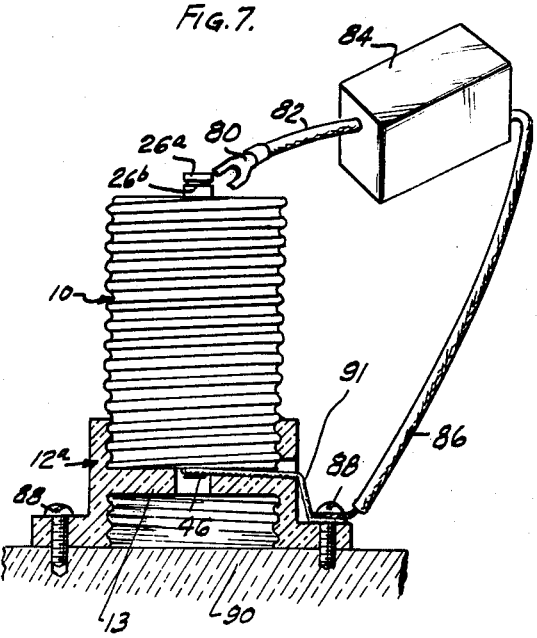

United States Patent Office 2,938,111
Patented May 24, 1960

2,938,111

FLASHLIGHT CONSTRUCTION

James J. Keilman, Chicago, Ill., assignor to L.J.R. Corporation, Chicago, Ill., a corporation of Illinois Filed Aug. 27, 1958, Ser. No. 757,624

5 Claims. (Cl. 240—10.61)

My invention relates to improvements in dry cell battery construction for use in making flashlights.

My invention relates more particularly to dry cell batteries so constructed that by the use of the same with other standard accessories or parts, the same may be easily utilized as power plants in certain arrangements, or assembled together to form one cell or plural battery cell flashlights or similar units.

The dry cell battery which forms the subject matter of this application has many advantages over the dry cell batteries at present on the market, as will be more apparent as the description progresses. The principal object of the present invention is to provide an improved dry cell battery in which the case or shell may be cylindrical but having surface corrugations which form a coarse right or left hand thread so that the battery may in practice be screw-threadedly mounted in any support for the same that has a coarse tapped bore. This makes is possible to join or couple together two or more batteries with a matching coupler, the coupler having a medial divider therein with an opening therethrough for receiving the end of a bulb, a positive post end of an adjacent battery, or to make contact with the negative end of a companion battery in series.

A further object of the invention is to provide a dry cell battery of the construction described which may be used in an electronic circuit by being screw-threadedly mounted in a suitable coupling, or by the use of which a complete flashlight may be constructed from one or more of the batteries described and one or more standard accessories or parts.

A further object of the invention is to provide a construction of batteries and couplers, caps or bulb receiving units, each of the units having threaded bores at opposite ends with a central divider therebetween, so that any one of the same may be used either to receive a bulb and reflector at the positive end of a battery secured thereto, may be used for joining two batteries together, positive end to negative end, or may be used as an end coupler to complete a flashlight assembly.

A further object of the invention is to provide a dry cell battery having corrugated or coarsely threaded outer shell so constructed that both ends of the same may be spun inwardly to close the same, thereby permitting the use of thinner metal for the shell and securing in the completed assembly a more rigid, compact and stronger battery unit.

A further object of the invention is to provide battery and accessories assemblies of the type described so that complete flashlight units may be easily and cheaply made, which are so constructed that they may be easily and quickly assembled for instant use by unskilled persons or even small children.

Other objects and advantages will be more apparent from the following description wherein reference is had to the accompanying drawings, upon which:

Fig. 1 is a front elevational view of a flashlight constructed in accordance with this invention;

Fig. 2 is a plan view thereof;

Fig. 3 is a cross-sectional view of the same taken on the line 3—3 of Fig. 1;

Fig. 4 is a transverse sectional view through the battery shell and associated parts and is taken on the line 4—4 of Fig. 3;

Fig. 5 is a vertical sectional view through one of the batteries showing the construction of the cell and associated parts;

Fig. 6 is a bottom plan view thereof; and

Fig. 7 is a generally diagrammatic view showing the manner in which one of the batteries and a mounting therefor could provide the same as a power plant for a transistor or other electrical unit.

In the embodiment of the invention which I have chosen to illustrate and describe the same, in Fig. 1 I have shown a pair of the new type batteries which I provide, the batteries 10 being mounted in an end-to-end relationship in a central coupler member 12. Similar coupler members 12 are also provided at both the upper and lower ends of the two batteries 10, and the lower coupler 12 may have a cap 14 connected thereto if desired to close the open end of the same.

As hereinbefore pointed out, each of the batteries 10 may be constructed of a corrugated outer zinc shell 20 that has been corrugated in a spiral to form an outer threaded exterior. Each of the couplers 12 is also provided with a threaded bore 22 for the reception of the same, so that in order to connect the coupler to the end of the battery case the same is simply screw-threadedly mounted as though a bolt were being fastened in place therein.

The battery 10 may include the usual carbon core 24 having the positive end 26, the same being fastened in a disc 28 stamped or otherwise constructed and fastened beneath the shoulder 30 of the head 26 by the electrolytic paste 32 which secures the zinc shell to the electrolyte 34 which fills the cell. The ends of the case may be spun in as shown at 40 and 42, the lower end of the battery having a disc 44 held therein, the disc having a stamped-out spring finger 46 so that a wire lead may be fastened thereunder and thus make frictional contact therethrough to form a circuit.

Referring again to the flashlight assembly shown in Figs. 1 to 4 inclusive, a flashlight may be easily assembled by fastening together one or more batteries between standard couplings 12. Thus in the assembly shown, the upper coupling 12 which has the medial wall 13 therein, is threaded to receive a reflector unit 50, the unit 50 also having a medial threaded bore 52 for the reception of the screw-threaded end 56 of a light bulb 54.

The reflector unit 50 is preferably formed with a hemispherical or bowl-shaped opening 60 which may be coated with a reflecting element so that when the bulb 54 is lit up the light from the same will be reflected forwardly.

The connection between the positive and negative ends of two or more batteries may be made by means of a wire conduit 62, the same having its wire end 64 exposed and fed through a side opening 66 in the coupler 12 so that it can be frictionally pressed against the side of the metal screw-threaded portion of the bulb 54. The wire 62 may be held adjacent the batteries and the couplers by strips of masking tape 68 and 70, and the bare end 72 of the wire may be entered through the opening 60 of the lower coupler and pressed under the spring finger 46 of the end disc of the battery 10, in this way completing a connection or circuit through the light bulb and batteries so that a flashlight has been made by the assembly shown.

To turn the light off, it is a simple matter to unscrew the bulb receptacle unit 50 breaking contact between the end of the bulb 54 and the head 26 of the carbon core 24, in which condition it may be carried until it is again desired to use the same. Also, in the event of replacement, it is a simple matter to disassemble the couplers and batteries for the replacement of either a battery or coupler. In this way they can be carried as stock parts on camping trips or for other purposes, and when needed may be assembled on the spot.

In Fig. 7 I have shown one method of employing both the newly constructed battery 10 and a coupler 12a in an electronic circuit or device. In this construction, however, I have formed the head 26a of the electrode 24 with side slots 26b so that a spade type terminal 80 may be frictionally connected to the same, the terminal 80 being at the end of a conduit 82 connected to a transistor 84 or similar unit. The other conductor 86 may connect to a combined binding post and fastening screw 88 for fastening the coupler 12a in place on a support 90, the coupler 12a having the battery 10 screw-threadedly mounted in position and the wire 91 leading from the post 88 to the spring finger 46 to complete the connection.

While I have illustrated the use of my improved battery in an electric circuit and also in use as a flashlight battery, it will be obvious that very many uses may be found for the same, and many and varied uses may be found for the coupler which I employ to connect the same together in series.

I contemplate that changes and modifications may be made in the exact details shown and I do not wish to be limited in any particular; rather what I desire to secure and protect by Letters Patent of the United States is:

1. Electric flashlight construction including a pair of storage batteries of the same size and shape, each battery having a cylindrical shell formed with a spiral thread thereon throughout its length, a circular coupler having threaded bores in both ends of the same and a medial wall dividing the same into two compartments, said coupler screw-threadedly attached to the top end of one of said batteries, a bulb receptacle having a cylindrical threaded portion screw-threadedly mounted in the upper threaded bore of said coupler, said bulb receptacle having an axial threaded bore, an electric light bulb mounted therein, a second coupler screw-threadedly attached to the lower end of said battery, a second battery having its upper end screw-threadedly attached to said second coupler, a third coupler screw-threadedly attached to the lower end of said second battery, the medial wall of each of said couplers having an axial bore therethrough, each coupler having an opening through a side wall, a flexible conduit having one end attached to the negative end of said second battery extending up along the sides of said couplers and batteries and having its other end attached to the threaded portion of said light bulb, thereby forming a connection between said batteries and said bulb for lighting purposes.

2. An electric flashlight including a storage battery having a cylindrical shell formed with a spiral thread thereon throughout its length, a coupler having a threaded bore in both ends thereof and a transverse wall dividing the same into two compartments, a medial bore through said wall, said coupler attached to the top end of said battery, a bulb receptacle having a cylindrical threaded portion screw-threadedly mounted in the upper threaded bore of said coupler, said bulb receptacle having an axial threaded bore, an electric light bulb mounted therein, a similar coupler attached to the lower end of said battery, each of said couplers having an opening through a side wall, a flexible conduit having one end attached to the negative end of said battery extending up along the side of said coupler and battery and having its other end connected to the threaded portion of said light bulb, thereby forming a connection between said battery and said bulb for lighting purposes.

3. An electric flashlight formed from a plurality of batteries each having a cylindrical shell formed with a spiral thread thereon and a plurality of couplers, each coupler having complementary bores in both ends of the same for receiving either end of one of said battery shells, said couplers placed between top and bottom ends of aligned batteries mechanically connecting them together in a rigid continuous length, each coupler also having a transverse wall between said open ends, a bore through each transverse wall, the ends of electrodes connected therethrough to form a continuous circuit through said batteries, a bulb receptacle having a cylindrical threaded portion for screw-threaded mounting in one end of one of said couplers, an electric bulb therein having its end engaging the carbon electrode of said first battery, and a wire extending from the side of said bulb to the negative end of the last battery.

4. An electric flashlight formed from a plurality of batteries each having a cylindrical shell formed with a spiral thread thereon and a plurality of couplers, each coupler having complementary bores in both ends of the same for receiving either end of one of said battery shells, said couplers placed between top and bottom ends of aligned batteries mechanically connecting them together in a rigid continuous length, each coupler also having a transverse wall between said open ends, a bore through each transverse wall, the ends of electrodes connected therethrough to form a continuous circuit through said batteries, a bulb receptacle having a cylindrical threaded portion for screw-threaded mounting in one end of one of said couplers, an electric bulb therein having its end engaging the carbon electrode of said first battery, a wire extending from the side of said bulb to the negative end of the last battery, and the negative end of each battery having a disc-shaped metal closure and a spring finger thereon for connection to a contact wire or to make a resilient connection with the top of an electrode said wire being received beneath the spring finger of said last battery to complete the circuit for said batteries.

5. An electric flashlight formed from a plurality of batteries each having a cylindrical shell formed with a spiral thread thereon and a plurality of couplers, each coupler having complementary bores in both ends of the same for receiving either end of one of said battery shells, said couplers placed between top and bottom ends of aligned batteries mechanically connecting them together in a rigid continuous length, each coupler also having a transverse wall between said open ends, a bore through each transverse wall for the ends of electrodes, a bulb receptacle having a cylindrical threaded portion screw-threadedly mounted in one end of an end coupler, an electric bulb therein, a wire extending from the side of said electric bulb to the negative end of the last battery, the negative end of each battery having a disc-shaped metal closure, a spring finger thereon for connection to said wire, said wire laid against the side of said assembly and several pieces of masking tape extending over said wire on both sides of the same and adhered to the shells of said batteries for fastening the wire to said assembly.

References Cited in the file of this patent

UNITED STATES PATENTS

| | | |
|---|---|---|
| 1,097,910 | Broad | May 26, 1914 |
| 1,374,168 | Recker | Apr. 5, 1921 |
| 1,508,373 | Lightfoot | Sept. 29, 1924 |
| 2,272,907 | Deibel | Feb. 10, 1942 |
| 2,392,795 | Anthony et al. | Jan. 8, 1946 |
| 2,396,693 | Glover | Mar. 19, 1946 |
| 2,494,265 | Samalion | Jan. 10, 1950 |
| 2,585,443 | Cox | Feb. 12, 1952 |
| 2,651,710 | Clark | Sept. 8, 1953 |